US009661085B2

(12) United States Patent (10) Patent No.: US 9,661,085 B2
Chamdani et al. (45) Date of Patent: May 23, 2017

(54) FEDERATED MANAGEMENT OF INTELLIGENT SERVICE MODULES

(71) Applicant: Brocade Communications Systems, Inc., San Jose, CA (US)

(72) Inventors: Joseph I. Chamdani, Santa Clara, CA (US); Gurumurthy D. Ramkumar, Palo Alto, CA (US); Bruce L. Younglove, Boulder, CO (US); Corey R. Hill, Broomfield, CO (US)

(73) Assignee: Brocade Communications Systems, Inc., San Jose, CA (US)

( * ) Notice: Subject to any disclaimer, the term of this patent is extended or adjusted under 35 U.S.C. 154(b) by 0 days.

(21) Appl. No.: 14/824,407

(22) Filed: Aug. 12, 2015

(65) Prior Publication Data

US 2015/0350347 A1 Dec. 3, 2015

Related U.S. Application Data

(63) Continuation of application No. 11/239,954, filed on Sep. 29, 2005, now Pat. No. 9,143,841.

(51) Int. Cl.
*G06F 15/173* (2006.01)
*G06F 15/16* (2006.01)
(Continued)

(52) U.S. Cl.
CPC .......... *H04L 67/16* (2013.01); *H04Q 3/0045* (2013.01); *H04Q 3/66* (2013.01)

(58) Field of Classification Search
CPC ......... H04L 67/16; H04Q 3/0045; H04Q 3/66
See application file for complete search history.

(56) References Cited

U.S. PATENT DOCUMENTS 5,774,119 A 6/1998 Alimpich et al.
5,801,700 A 9/1998 Ferguson
(Continued)

FOREIGN PATENT DOCUMENTS

EP 1206075 A2 5/2002
EP 1528730 A2 5/2005
(Continued)

OTHER PUBLICATIONS

Avici Systems, Inc., the Use of Composite Links to Facilitate the Creation of a New Optical Adaptation Layer White Paper (visited Dec. 14, 2001) <http://avici.com/technology.whitepapers/Composite_links.pdf>.

(Continued)

*Primary Examiner* — Kiet Tang
(74) *Attorney, Agent, or Firm* — Blank Rome, LLP

(57) ABSTRACT

Intelligent services are provided in a storage network using intelligent service modules that can be cabled to a switch external to the switch chassis and yet be managed as part of the switch's logical domain. Data and management communications between the intelligent service module and the core switch are provided through a "soft-backplane" implemented using in-band communications through cabling attached between the switch and the intelligent service module rather than through a hardwired backplane within the chassis. Management communications from management software is directed to the switch, which handles the management functions relating to the intelligent service module or forwards the management requests to the intelligent service module for processing.

20 Claims, 9 Drawing Sheets

(51) Int. Cl.
| | |
|---|---|
| *G06F 11/30* | (2006.01) |
| *H04L 29/06* | (2006.01) |
| *H04L 29/08* | (2006.01) |
| *H04Q 3/00* | (2006.01) |
| *H04Q 3/66* | (2006.01) |

(56) References Cited

U.S. PATENT DOCUMENTS

| | | | |
|---|---|---|---|
| 5,838,911 A | 11/1998 | Rosenhauer et al. | |
| 5,859,718 A | 1/1999 | Yamamoto et al. | |
| 5,905,725 A | 5/1999 | Sindhu et al. | |
| 6,049,828 A | 4/2000 | Dev et al. | |
| 6,259,448 B1 | 7/2001 | McNally et al. | |
| 6,360,362 B1 | 3/2002 | Fichtner et al. | |
| 6,400,730 B1 | 6/2002 | Latif et al. | |
| 6,427,173 B1 | 7/2002 | Boucher et al. | |
| 6,477,619 B1 | 11/2002 | Fujimoto et al. | |
| 6,484,261 B1 | 11/2002 | Wiegel | |
| 6,504,820 B1 | 1/2003 | Oliva | |
| 6,542,507 B1 | 4/2003 | Khacherian et al. | |
| 6,580,709 B1 | 6/2003 | Gorshe et al. | |
| 6,597,689 B1 | 7/2003 | Chiu et al. | |
| 6,658,504 B1 | 12/2003 | Lieber et al. | |
| 6,661,787 B1 | 12/2003 | O'Connell et al. | |
| 6,665,495 B1 | 12/2003 | Miles et al. | |
| 6,724,757 B1 | 4/2004 | Zadikian et al. | |
| 6,754,206 B1 | 6/2004 | Nattkemper et al. | |
| 6,792,502 B1 | 9/2004 | Pandya et al. | |
| 6,895,433 B1 | 5/2005 | Slater et al. | |
| 6,898,276 B1 | 5/2005 | Millet | |
| 6,904,053 B1 | 6/2005 | Berman | |
| 6,954,437 B1 | 10/2005 | Sylvest et al. | |
| 7,020,145 B1 | 3/2006 | Symons et al. | |
| 7,093,027 B1 | 8/2006 | Shabtay et al. | |
| 7,120,728 B2 | 10/2006 | Krakirian et al. | |
| 7,180,866 B1 | 2/2007 | Chartre et al. | |
| 7,246,344 B1 | 7/2007 | Christensen et al. | |
| 7,254,581 B2 | 8/2007 | Johnson et al. | |
| 7,275,098 B1 | 9/2007 | Becher et al. | |
| 7,280,546 B1 | 10/2007 | Sharma et al. | |
| 7,281,044 B2 | 10/2007 | Kagami et al. | |
| 7,283,519 B2 | 10/2007 | Girard | |
| 7,287,090 B1* | 10/2007 | Berg | H04L 67/1008 709/219 |
| 7,301,898 B1 | 11/2007 | Martin et al. | |
| 7,367,028 B2 | 4/2008 | Kodosky et al. | |
| 7,397,778 B2 | 7/2008 | Jay et al. | |
| 7,400,590 B1 | 7/2008 | Rygh et al. | |
| 7,430,164 B2 | 9/2008 | Bare | |
| 7,433,300 B1 | 10/2008 | Bennett et al. | |
| 7,979,854 B1 | 7/2011 | Barole et al. | |
| 8,194,656 B2 | 6/2012 | Sajassi et al. | |
| 2001/0047311 A1 | 11/2001 | Singh | |
| 2002/0004912 A1 | 1/2002 | Fung | |
| 2002/0093952 A1 | 7/2002 | Gonda | |
| 2002/0107992 A1 | 8/2002 | Osbourne et al. | |
| 2002/0116564 A1 | 8/2002 | Paul et al. | |
| 2002/0163910 A1 | 11/2002 | Wisner et al. | |
| 2002/0194524 A1 | 12/2002 | Wiley et al. | |
| 2003/0033427 A1 | 2/2003 | Brahmaroutu | |
| 2003/0118021 A1 | 6/2003 | Donoghue et al. | |
| 2003/0137941 A1 | 7/2003 | Kaushik et al. | |
| 2003/0158971 A1 | 8/2003 | Renganarayanan et al. | |
| 2003/0179777 A1 | 9/2003 | Denton et al. | |
| 2003/0182422 A1 | 9/2003 | Bradshaw et al. | |
| 2003/0208581 A1 | 11/2003 | Behren et al. | |
| 2003/0233427 A1 | 12/2003 | Taguchi | |
| 2004/0013092 A1 | 1/2004 | Betker et al. | |
| 2004/0024887 A1 | 2/2004 | Grabauskas et al. | |
| 2004/0025013 A1* | 2/2004 | Parker | H04N 7/17318 713/163 |
| 2004/0073676 A1 | 4/2004 | Honma et al. | |
| 2004/0078599 A1 | 4/2004 | Nahum | |
| 2004/0100980 A1 | 5/2004 | Jacobs et al. | |
| 2004/0141521 A1 | 7/2004 | George | |
| 2004/0218531 A1 | 11/2004 | Cherian et al. | |
| 2005/0036499 A1 | 2/2005 | Dutt et al. | |
| 2005/0050240 A1 | 3/2005 | Wilkins et al. | |
| 2005/0063397 A1 | 3/2005 | Wu et al. | |
| 2005/0091353 A1 | 4/2005 | Gopisetty et al. | |
| 2005/0094568 A1 | 5/2005 | Judd | |
| 2005/0094649 A1 | 5/2005 | Varanasi et al. | |
| 2005/0105560 A1 | 5/2005 | Mann et al. | |
| 2005/0108444 A1 | 5/2005 | Flauaus et al. | |
| 2005/0182838 A1 | 8/2005 | Sheets et al. | |
| 2005/0203647 A1 | 9/2005 | Landry et al. | |
| 2005/0213560 A1 | 9/2005 | Duvvury | |
| 2005/0231462 A1 | 10/2005 | Chen | |
| 2005/0281196 A1 | 12/2005 | Tornetta et al. | |
| 2006/0023751 A1 | 2/2006 | Wilson et al. | |
| 2006/0034302 A1 | 2/2006 | Peterson | |
| 2006/0036822 A1 | 2/2006 | Kaji | |
| 2006/0069824 A1 | 3/2006 | Hodder | |
| 2006/0080430 A1* | 4/2006 | Barsuk | H04L 12/2602 709/224 |
| 2006/0080656 A1 | 4/2006 | Cain et al. | |
| 2006/0092853 A1 | 5/2006 | Santoso et al. | |
| 2006/0182041 A1 | 8/2006 | Graves | |
| 2006/0221813 A1 | 10/2006 | Scudder et al. | |
| 2007/0140130 A1 | 6/2007 | Valdes et al. | |
| 2007/0147364 A1 | 6/2007 | Palacharla et al. | |
| 2007/0248029 A1 | 10/2007 | Merkey et al. | |

FOREIGN PATENT DOCUMENTS

| | | |
|---|---|---|
| WO | 01/71524 A | 9/2001 |
| WO | 01/80013 A | 10/2001 |
| WO | 2005/004408 A1 | 1/2005 |
| WO | 2005/024557 A | 3/2005 |

OTHER PUBLICATIONS

Baltazar, Henry, "Deciphering NAS, SAN storage ware," EWEEK, Apr. 9, 2001, p. 26, Ziff Davis Publishing, Inc., New York, New York, United States of America.

Berkowitz, Howard, "Designing Routing and Switching Architectures," Chapter 9, connection-oriented switching, pp. 507-511, 1999, Network Architecture and Development Series, MacMillan Technical Publishing.

Dunstan, Adam et al., Reliable Backbone Bandwidth Using Composite Links White Paper (visited Dec. 14, 2091) <http://www.avici.com/technology/whitepapers/reliable_backbone.pdf>.

European Search Report, prepared by the European Patent Office for European Application No. EP 06118654, Jun. 28, 2007, 3 pages.

European Search Report, prepared by the European Patent Office for European Application No. EP 061246062, dated Sep. 25, 2007, 3 pages.

Extended European Search Report, prepared by the European Patent Office for European Application No. EP 36121329, dated Feb. 27, 2009, 8 pages.

Fetters, Dave, "Storage Options," Network Computing, May 15, 2000 <http://www.network computing.com/1109/1109ws12.html>.

Fetters, Dave, "The Fabric of Your Life," Network Computing, May 15, 2000 <http://www.networkcomputing.com/1109/1109ws12.html>.

Fetters, Dave, "Why a SAN," Network Computing, May 15, 2000 <http://www.networkcomputing.com/1109/1109ws1.html>.

Fibre Channel Systems, "Overview of the Technology" (visited Apr. 3, 2001) <http://www.fibrechannel.com/technology/overview.html>.

Goldworm, Barb, "The Difference Between SANs and NAS," Networkworldfusion, Oct. 2, 2000 <http://www.nwfusion.com/newsletters/stor/2000/1002stor1.html>.

GR-253-CORE, Synchronous Optical Network (SONET) Transport Systems: Common Generic Criteria, Sep. 2000, Telcordia Technologies, Issue 3, Chapter 3.

IBM Tivoli Storage Manager—Product Overview, at http://www-306.ibm.com/software/tivoli/products/storage-mgr/, updated Jul. 13, 2006, 3 pages, printed Aug. 9, 2006.

(56) References Cited

OTHER PUBLICATIONS

IBM Tivoli Storage Manager for Storage Area Networks—Product Overview, at http://www-306.ibm.com/software/tivoli/products/storage-mgr-san/, 2 pages, updated Dec. 13, 2006, printed Aug. 9, 2006.
IBM, Inc., "SAN Basics" (visited Apr. 3, 2001) <http://www.storage.ibm.com.ibmsan/basics.html>.
Infrastor Technologies Corp., "Introduction to SAN" (visited Apr. 3, 2001) <http://infrastor.com/tech/SANTechIntro.html>.
Partial European Search Report, prepared by the European Patent Office for European Application No. EP 06121329, dated Nov. 4, 2008, 4 pages.
Series G: Transmission System and Media, Digital Systems and Networks, Architecture of Transport Networks Based on the Synchronous Digital Hierarchy (SDH), ITU_T recommendation G.803, Mar. 2000.
Shah, Rawn, "Storage Beyond RAID," Connectivity (visited Apr. 3, 2001) <http://www.unisinsider.com/unixinsidereonline?swol-07-1999/swol-07-connectivity_p.html>.
Techencyclopedia, SAN (visited Apr. 3, 2001) <http://www.techweb.com/encyclopedia.defineterm?term=SAN>.
U.S. Appl. No. 09/895,288, Applicant Joseph Chamdani et al.
U.S. Appl. No. 09/943,660, Applicant Joseph Chamdani et al.
U.S. Appl. No. 09/943,842, Applicant Joseph Chamdani et al.
U.S. Appl. No. 09/944,425, Applicant Joseph Chamdani et al.
Zeichick, Alan, "4 Storage Area Networks," Internetweek, Sep. 25, 2000 <http://www.internetwk.com/reviews00/rev092500.html>.
Ottem, Erik, SANS for High Availability Systems White Paper, Gadzoox Networks, Inc. (2001).
Dott Hill Systems Corp., "SAN Tutorial" (visited Apr. 3, 2001) <http://www.the-storage-in.com/topic01.html>.
"BCM56504 24-Port GbE Multilayer Switch with Four 1-GbE/HiGig+™ Ports," http://www.broadcom.com/products/Enterprise-Networking/Gigabit-Ethernet-Switching-Products/BCM56504, (downloaded Dec. 11, 2006).
"BCM56504 Product Brief—24-Port BgE Multilayer Switch with Four 10 GbE/HiGig+™ Ports," Broadcom Corporation, 2006.
"Broadcom announces StrataXGS® III—The World's First Integrated Ethernet Switch Solutions Featuring Embedded Security, IPv6 Routing and Wireless LAN Support—First Multi-Layer Switch With 24 Gigabit Ethernet (GbE) Ports and Four 10GbE Ports," http://www.broadcom.com/press/release.php?id=665681&printable=1, Broadcom Corporation, 2005, (downloaded Nov. 17, 2006).
CNT Introduces New Generation Storage Networking Infrastructure, at http://web.archive.org/web/20050206034944/www.cnt.com/cntinews/gr/2004/07-19-00, 3 pages, © 2003-2005, printed Jul. 19, 2006.
Cisco MDS 9000 Family of Multilayer Directors and Fabric Switches, at http://www.cisco.com/en/US/products/ps6446/prod_brochure0900aecd80355d56.html, 3 pages, © 1992-2005, printed Jul. 19, 2006.
Cisco MDS 9000 Family Networked Storage Solutions for Small and Medium-Sized Businesses—At-a-Glance, 2-page product brochure, © 1992-2005 Cisco Systems, Inc.
DStar: CNT Remains FICON Leader with UltraNet Multi-Service Director, at http://www.taborcommunications.com/dsstar/04/1109/109456.html, 2 pages, printed Jul. 19, 2006.
CD/9000 Channel Director—Product Detail by CNT, at http://web.archive.org/web/20050204044510/www.cnt.com/products/switching/cd9000, 2 pages, © 2003-2005, printed Jul. 19, 2006.
FC/9000 Fibre Channel/FICON Director—Product Detail by CNT, at http://web.archive.org/web/20050205081213/www.cnt.com/products/switching/cd9000, 3 pages, © 2003-2005, printed Jul. 19, 2006.
McData—Intrepid® 6140 Director, product brochure, 2 pages, © 2006 McData Corporation.
McData—Intrepid® 10000 Director, product brochure, 2 pages, © 2006 McData Corporation.

\* cited by examiner

FEDERATED MANAGEMENT OF INTELLIGENT SERVICE MODULES

CROSS REFERENCE TO RELATED APPLICATIONS

This application is a continuation of U.S. patent application Ser. No. 11/239,954 entitled "Federated Management of Intelligent Service Modules," filed Sep. 29, 2005, which is incorporated by reference in its entirety herein.

TECHNICAL FIELD

The invention relates generally to storage area networks, and more particularly to federated management of intelligent service modules in a storage area network.

BACKGROUND

A storage area network (SAN) may be implemented as a high-speed, special purpose network that interconnects different kinds of data storage devices with associated data servers on behalf of a large network of users. Typically, a storage area network includes high-performance switches as part of the overall network of computing resources for an enterprise. The storage area network is usually clustered in close geographical proximity to other computing resources, such as mainframe computers, but may also extend to remote locations for backup and archival storage using wide area network carrier technologies. Fibre Channel networking is typically used in SANs although other communications technologies may also be employed, including Ethernet and IP-based storage networking standards (e.g., iSCSI, FCIP (Fibre Channel over IP), etc.).

In one configuration, switches are assembled in a chassis using a selection of blade components of a SAN switch. Individual blade components are fitted into slots in the chassis and connected to a chassis backplane for interconnectivity. For example, line card blades, switch blades, and other blade components can be inserted into a chassis to provide a scalable and customizable storage network switch configuration. Typically, the blades are controlled by shared control processors (e.g., one active and one backup), powered by one or more shared power supplies through the backplane, and cooled by a shared set of cooling fan trays.

Fabric-based intelligent services, such as routing, virtualization, and distance services, may be added to a switch to enhance the performance, scalability, and features of the switch. For example, a wide area connectivity service blade can be inserted into an open slot in the chassis to provide fibre channel over IP bridging. In this fashion, the intelligent services can be managed as part of the switch.

However, adding such services as blades in a chassis presents significant limitations. A chassis has a limited number of slots, and a SAN administrator may not have an open slot in which to add an intelligent service blade. Even with an available slot, a service blade adds additional risk to the core switch, reducing the overall mean-time-between-failures (MTBF). Further, intelligent service blades tend to run hotter than core switch blades and therefore require placement in the better-cooled slots in the chassis. If such slots are already occupied by other blades, addition of a service blade can disrupt service as the other blades are moved around in the chassis. A chassis backplane also has power and signaling constraints that can restrict the scalability of a switch, particularly when an intelligent services blade is added to the chassis.

SUMMARY

Implementations described and claimed herein address the foregoing problems by providing intelligent services using intelligent service modules that can be cabled to a switch external to a chassis and yet be managed through the switch. In some implementations, such intelligent service modules may be managed as part of the switch's logical domain. Data and management communications between the intelligent service module and the core switch are provided through a "soft-backplane" implemented using in-band communications between the switch and the intelligent switch module rather than a hardwired backplane within the chassis.

Each intelligent service module can be managed through the switch and/or within the same logical domain as the switch, such that a traditional physical Ethernet (i.e., out-of-band) connection between management software and each intelligent service module can be omitted. In this configuration, the switch can handle much of the management of the intelligent service module and otherwise forwards management communications received by the switch from the management software to the intelligent service module.

In some implementations, articles of manufacture are provided as computer program products. One implementation of a computer program product provides a non-transitory computer program storage medium readable by a computer system and encoding a computer program. Exemplary storage media may include without limitation magnetic and optical disks, EEPROMS, flash memory, RAM, and other storage devices.

Other implementations are also described and recited herein.

BRIEF DESCRIPTIONS OF THE DRAWINGS

DETAILED DESCRIPTIONS

Federated management of intelligent service modules in a storage area network brings a combination of new management concepts and capabilities to traditional switching products. Intelligent service modules can be located external to a switch chassis and communicate with the switch components in the chassis via an external cable using a communications transport mechanism between the switch components and the intelligent service modules. In one implementation, for example, IPFC (Internet Protocol over Fibre Channel) is employed as the transport mechanism between a switch and an intelligent service module. The intelligent service module is cabled to a switch through fibre channel ports in each device, such that the communications between the intelligent service module and the port module are "in-band" communications relative to the data communications of the switching network.

Each intelligent service module can be managed within the same logical domain as the switch, such that a traditional physical Ethernet (i.e., out-of-band) connection between management software and each intelligent service module can be omitted. In this configuration, the switch can handle much of the management of the intelligent service module and otherwise forwards management communications received by the switch from the management software to the intelligent service module.

Generally, a switching fabric involves a collection of interconnected switches that are capable of communicating among them. In contrast, a SAN can comprise one or more fabrics.

Figure 1:
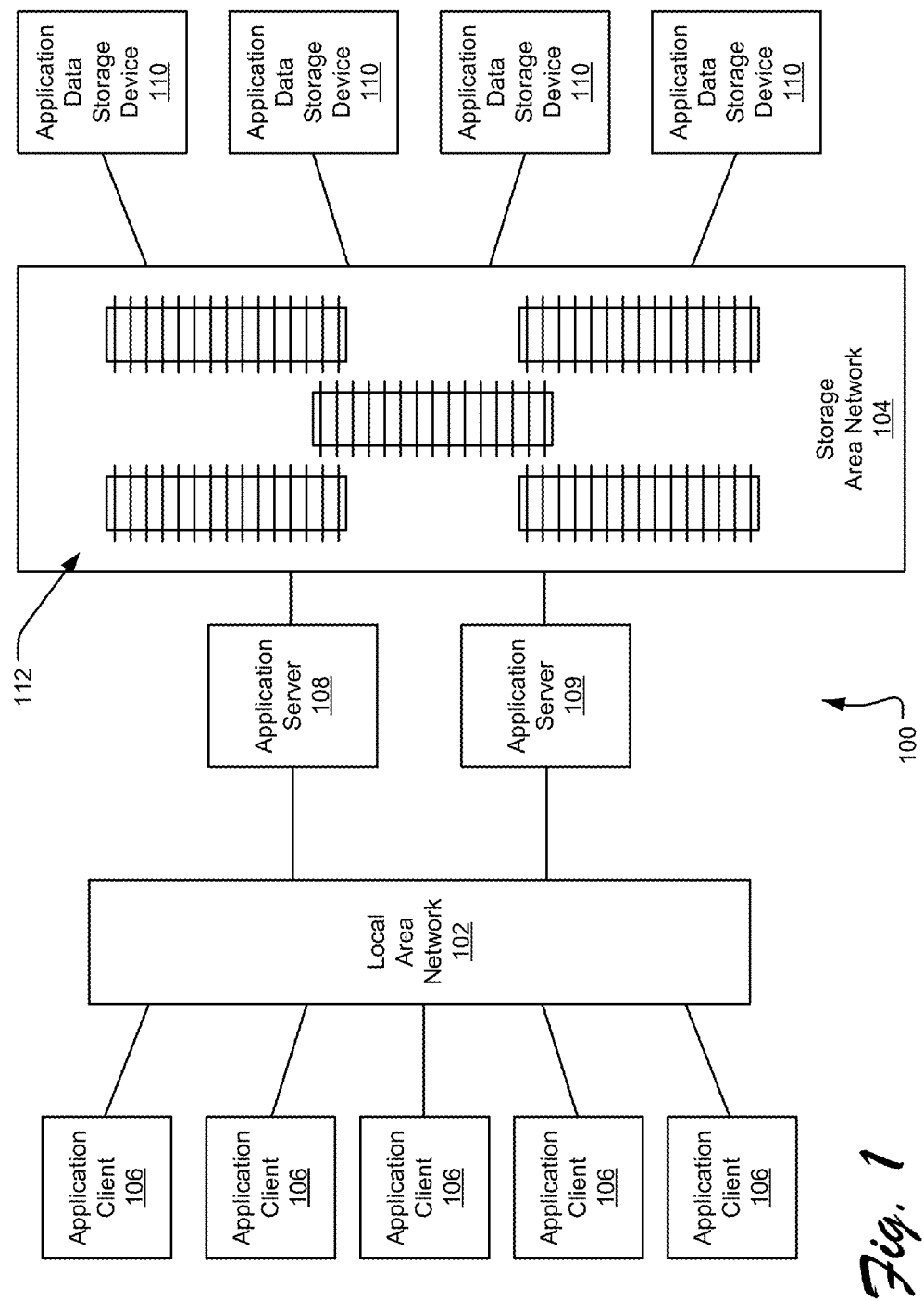
FIG. 1 illustrates an exemplary computing and storage framework including a local area network (LAN) and a storage area network (SAN).

FIG. 1 illustrates an exemplary computing and storage framework 100 including a local area network (LAN) 102 and a storage area network (SAN) 104. Various application clients 106 are networked to application servers 108 and 109 via the LAN 102. Users can access applications resident on the application servers 108 and 109 through the application clients 106. The applications may depend on data (e.g., an email database) stored at one or more of the application data storage devices 110. Accordingly, the SAN 104 provides connectivity between the application servers 108 and 109 and the application data storage devices 110 to allow the applications to access the data they need to operate. It should be understood that a wide area network (WAN) may also be included on either side of the application servers 108 and 109 (i.e., either combined with the LAN 102 or combined with the SAN 104).

With the SAN 104, one or more switches 112 provide connectivity, routing and other SAN functionality. Some such switches 112 may be configured as a set of blade components inserted into a chassis or as rackable or stackable modules. The chassis has a back plane or mid-plane into which the various blade components, such as switching blades and control processor blades, may be inserted. Rackable or stackable modules may be interconnected using discrete connections, such as individual or bundled cabling.

In the illustration of FIG. 1, at least one switch 112 is coupled to at least one external intelligent service module. Rather than being inserted into an open slot in the switch chassis, the intelligent service module is connected to the switch 112 via an optical or wired cable. The intelligent service module can nevertheless be managed within the same logical domain as the switch without the need for a separate out-of-band connection. In addition, the intelligent service module can be "attached" or added to the switch without disrupting operation of the switch (e.g., to move blades or make chassis slots available).

Figure 2:
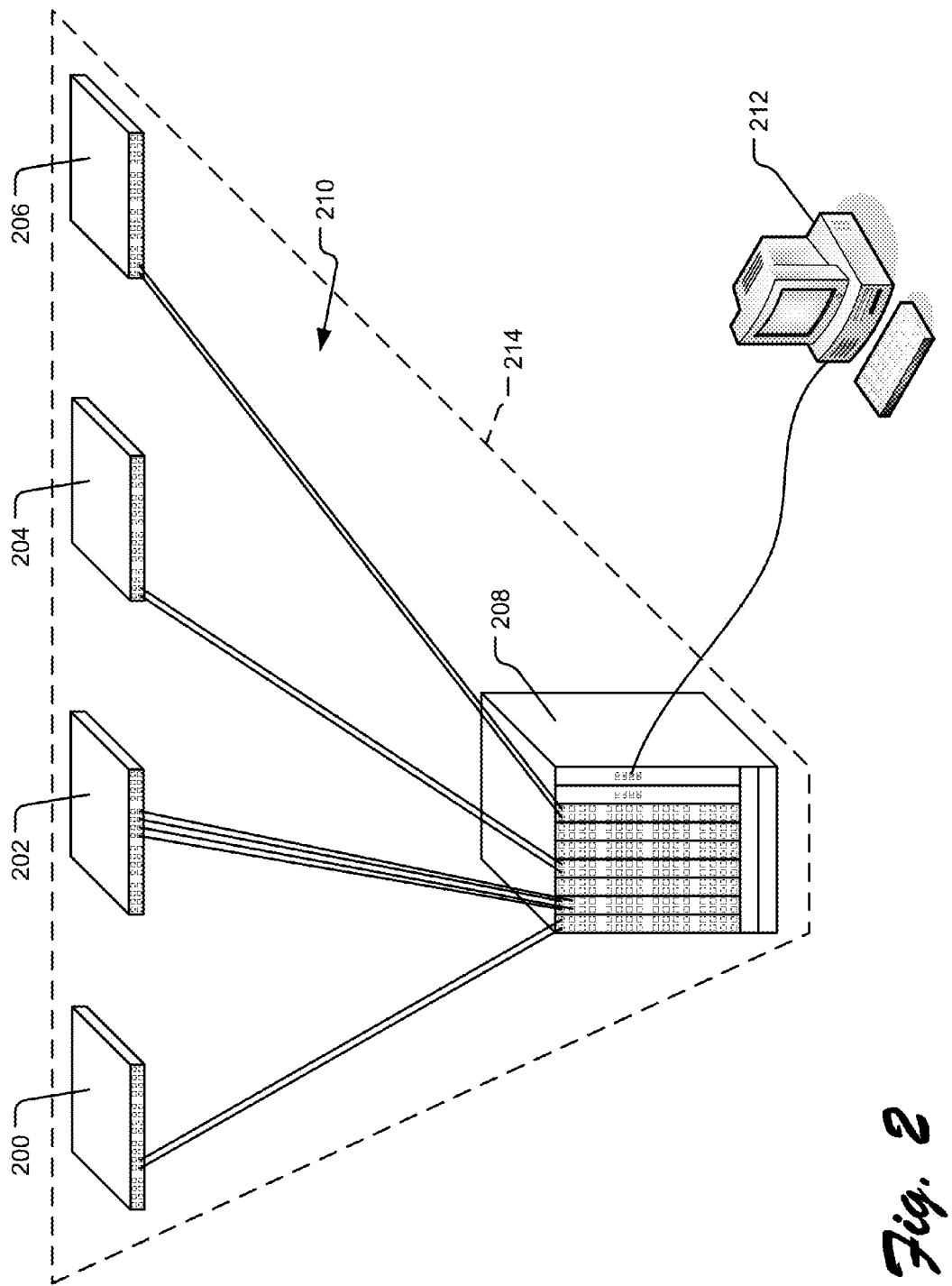
FIG. 2 illustrates exemplary multiple intelligent service modules connected to a chassis-based director-level switch.

FIG. 2 illustrates exemplary multiple intelligent service modules 200, 202, 204, and 206 connected to a chassis-based director-level switch 208. Fibre channel ports of each intelligent service module 200, 202, 204, and 206 are connected to fibre channel ports in the switch 208 by optical cabling 210 (although wired cabling, such as copper cabling, may alternatively be employed). Each illustrated intelligent service module has separate power supplies and cooling mechanisms, although individual intelligent service modules may share power supplies and/or cooling mechanisms in alternative configurations.

A management client 212 is connected to the switch 208 via an Ethernet connection. The management client 212 provides user control and monitoring of various aspects of the switch and attached devices, including without limitation, zoning, security, firmware, routing, addressing, etc. The management client 212 may identify the managed switch using a domain ID specific to the switch and, in a federated management configuration, shared with attached intelligent service modules. In addition, the management client 212 may identify the managed switch using a World Wide Name (WWN) or an IP address. In cases where a switch implements multiple virtual fabrics, the management client may use more than one domain ID in its communications with the switch. The management client 212 therefore can send a management request referencing the domain ID of the switch, an intelligent service module identifier, and a port identifier of an attached intelligent service module, and the switch will perform whatever portion of the requested management function it is capable of performing (if any) and forwards instructions to the intelligent service module possessing the referenced port for additional activity, if necessary.

Despite being external from the chassis, the intelligent service modules 200, 202, 204, and 206 can be managed within the same logical domain 214 as the switch 208. As discussed herein, each switch is attributed with a domain ID, each intelligent service module is attributed with a unique intelligent service module identifier within the logical domain 214 associated with the domain ID, and one or more ports of the intelligent service module are attributed with unique port identifier within the intelligent service module identifier. In this manner, the management client 212 can uniquely identify individual intelligent service modules and ports within the logical domain 214 of the switch and the switch can handle some portion of the management requests while forwarding certain management functions to the appropriate intelligent service module for processing, when necessary.

In the illustrated implementation, the intelligent service module 200 represents a virtualization intelligent service module (VSM) that provides Layer 4 SCSI/block storage services. The VSM 200 provides virtualization services and flexible switch connectivity. The VSM 200 has fibre channel ports, which can be connected by cabling to the switch 208 to provide private uplink connection. One of the uplinks can be designated as an active path and another of the uplinks can be designated as a standby path. Upon failover, the standby path is promoted to the active path, and another uplink is designated as the new standby path. Alternatively, communications can be spread among all available links.

Each virtual device (e.g., a virtual target or virtual initiator of the virtualization engine) within the VSM 200 logs into the switch 208 indirectly using a specified protocol. Each of these virtual devices also logs in with NPIV (Nport ID Virtualization), which provides a fibre channel facility for sharing a single physical port among multiple port IDs. In this manner, multiple virtual initiators are capable of sharing the port, with each initiator having its own port ID. Accordingly, the VSM 200 appears to the switch 208 as an extended end device, rather than another switch. Therefore, the VSM 200 does not consume another domain ID; it falls within the logical domain of the switch 208.

Another intelligent service module 202 in the illustration of FIG. 2 represents a routing intelligent service module (RSM) that provides Layer 3 SAN routing services. The RSM 202 provides inter-fabric routing between physical and virtual fabrics within the SAN. Yet another intelligent service module 204 in FIG. 2 represents a WAN intelligent service module (WSM) that can provide wide area connectivity, including iFCP or FCIP bridging, FICON tunneling, and streaming, such as fast write, compression, encryption, etc. Yet another intelligent service module 206 in FIG. 2 represents an aggregation intelligent service module (ASM) that aggregates end devices (e.g., host initiators or storage targets) to the attached switch 208, thereby simplifying the core-edge topology into a collapsed core that is a logical part of the switch 208.

Figure 3:
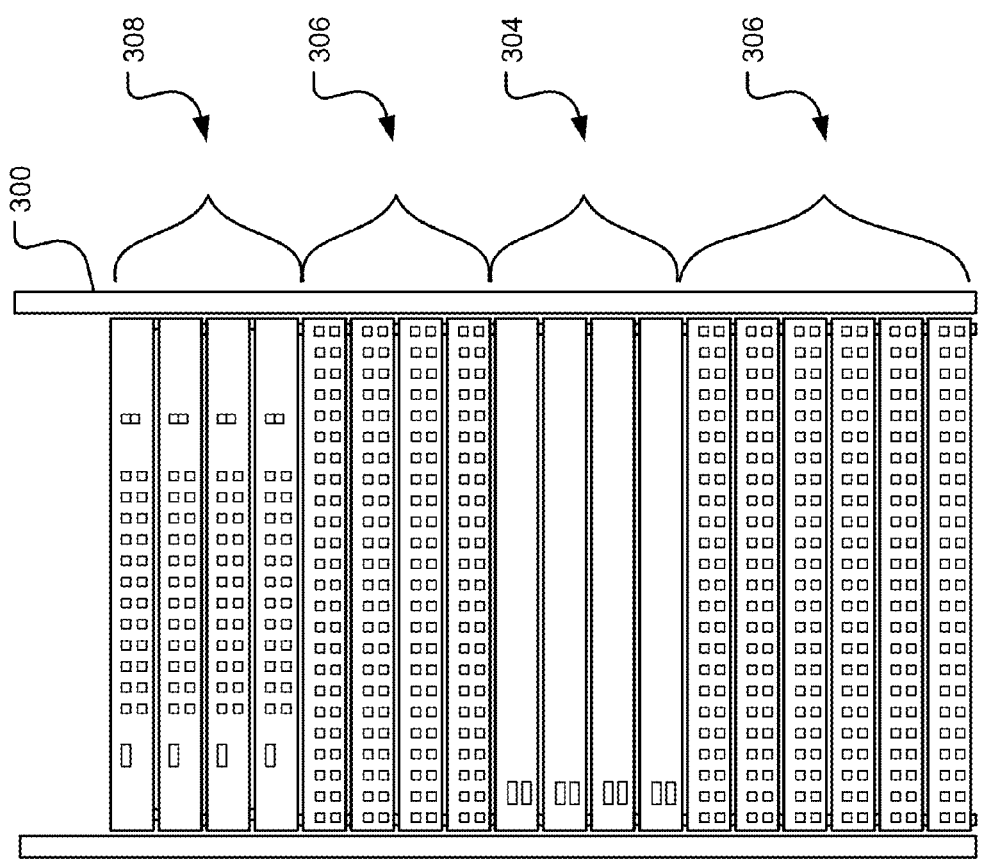
FIG. 3 illustrates a rack of an exemplary modular SAN switch including switch modules and port modules, coupled to multiple intelligent service modules.

FIG. 3 illustrates a rack 300 of an exemplary modular SAN switch 302 including switch modules 304 and port modules 306, coupled to intelligent service modules 308. The illustration shows an alternative configuration in which the blade-and-chassis switch is replaced with multiple port modules and switch modules, which can be connected via cabling to one or more intelligent service modules. In one implementation, the intelligent service modules 308 connect to the switch 302 via cabling (not shown) to fibre channel ports on the front of the port modules 306. Alternatively, the intelligent service modules 308 can connect via cabling (not shown) to backplane extender ports in the back of the intelligent switch modules 308. In either case, the intelligent service modules 308 are managed through the switch 302, and in some implementations, managed within a logical domain of the switch 302.

Figure 4:
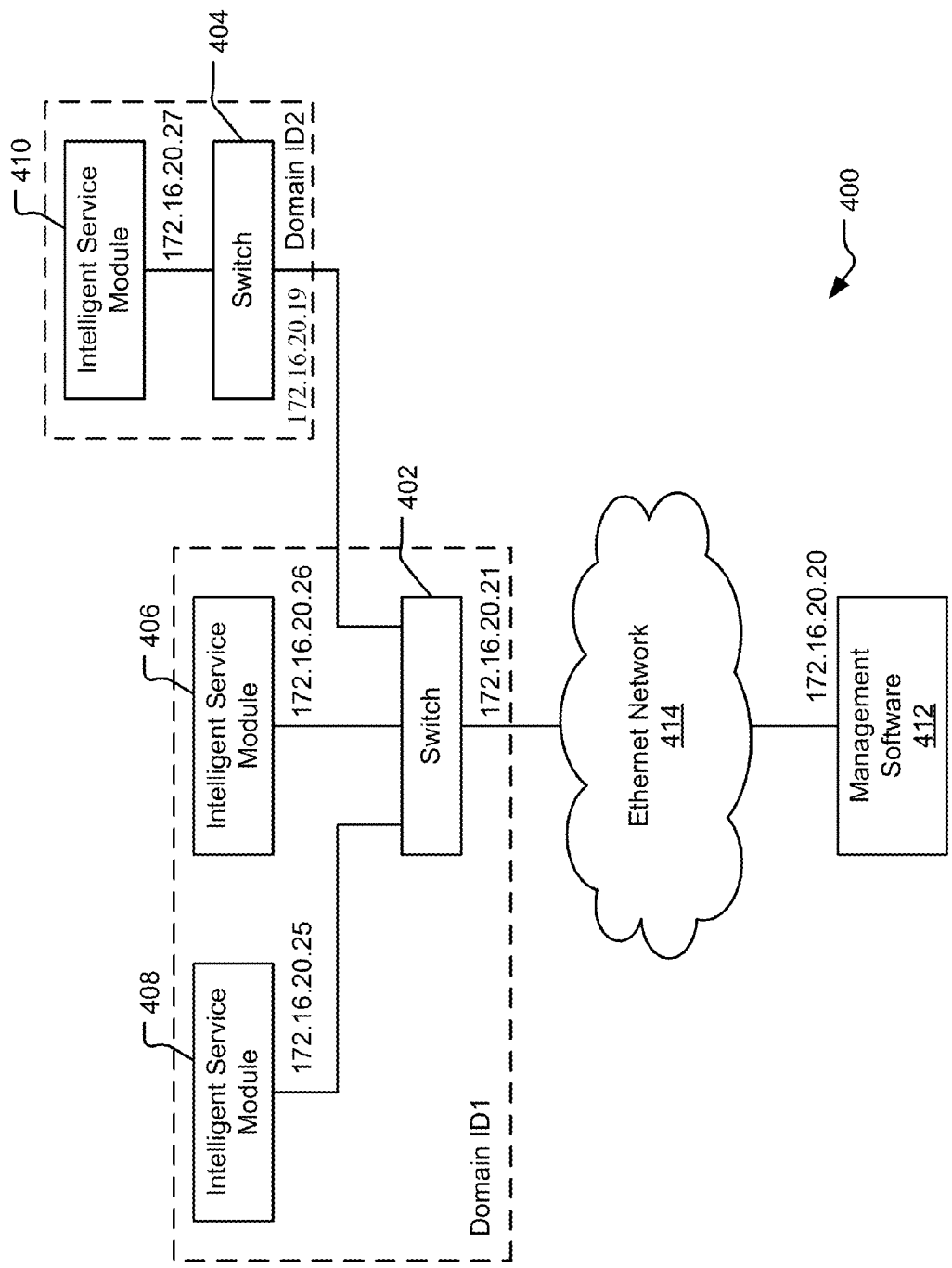
FIG. 4 illustrates an exemplary management network configuration including multiple switches and multiple intelligent service modules.

FIG. 4 illustrates an exemplary management network configuration 400 including multiple switches 402 and 404 and multiple intelligent service modules 406, 408, and 410. In one configuration, a switch and an intelligent service module are connected by one or more fibre channel cables attached to fibre channel ports in each module. Management traffic, such as from a management client 412 to the switch 402, travels through an Ethernet network 414 to a management Ethernet port in the switch 402. In the event the management traffic is forwarded or otherwise sent to the intelligent service module 406, for example, the traffic is transmitted across the fibre channel connection between the switch 402 and the intelligent service module 406 via a fibre channel transport mechanism. The transport mechanism employed in the illustrated configuration is IPFC (IP over Fibre Channel), for which IP addresses (e.g., 172.16.20.25 and 172.16.20.26) are assigned to each intelligent service module 406 and 408 or other device within the federated management configuration, such as the switch 402 and the intelligent service module 410). (Hereafter, the IP addresses for intelligent service modules on the fibre channel connections are referred to as IPFC addresses to distinguish them from Ethernet IP addresses of various devices (e.g., 172.16.20.20 and 172.16.20.21).) The management client 412 can use the IPFC addresses to route management traffic (e.g., IP packet forwarding) through the switch 402 to the appropriate intelligent service modules attached to the switch 402. Alternatively, the management client 412 can route management traffic directed at an intelligent service module to the switch 402 by specifying the domain ID, an intelligent service module identifier, and a port identifier, if necessary.

In one implementation, the management software 412 may also direct management traffic through the switch 402 to the switch 404 and the intelligent service module 410. In this manner, a single management Ethernet connection to a single switch (402) can be used to manage devices, such as intelligent service modules and switches, throughout the storage network. For example, the management software 412 can specify the domain ID1 (of the switch 402), a switch identifier (e.g., domain ID2) of the switch 404, an intelligent service module identifier of the intelligent service module 410, and a port identifier of a port on the intelligent service module 410. In this implementation, the switch 402 interprets the management request as destined for another logical domain and forwards the request to the switch 404 according to the domain ID2. Thereafter, the switch 404 determines the IPFC address of the appropriate intelligent service module and forwards the request to the intelligent service module 410 via the fibre channel connection. In alternative implementations, the management software may additionally or alternatively address a switch using an IP address or WWN.

The exemplary IPFC implementation for communicating between switches and intelligent service modules allows management traffic from the management software to travel through the switch to the appropriate intelligent service modules using in-band communications while requiring minimal processing by the switch. In one implementation, management Ethernet packets are sent to the switch's MAC address using a proxy-ARP (address resolution protocol) function on the switch (e.g., included in Ethernet Interface/Network Management Services module 516 of FIG. 5). When the management software 412 issues an ARP request for an intelligent service module IPFC address, the switch answers with its own MAC address. Therefore, for intelligent service modules within federated management of the switch 402, the ARP table within the management software 412 contains the MAC address of the switch 402. Accordingly, when the management software 412 sends out management requests to such an intelligent service module, the packets are sent to the switch 402.

When the switch 402 receives a management request specifying an intelligent service module, the switch 402 examines the IPFC address in the request and recognizes it as not matching its own IP address. Therefore, the switch 402 looks up another destination address on its fibre channel connection to which to send the request via IPFC, typically using a local federated management address table that is similar to an ARP table. An exemplary local federated management address (FMA) table is shown below for an IP address of a switch, an intelligent service module, with reference to the IP/IPFC addresses in FIG. 4 (Note: In the example given in Table 1, end devices (e.g., targets or initiators) are referenced by WWPNs.):

TABLE 1

Exemplary local federated management address (FMA) table

| Example IP/IPFC Address | Device Type | WWNN/ WWPN | Domain_ID | Port Number |
| --- | --- | --- | --- | --- |
| 172.16.20.19 | Switch | WWNN | Domain controller of destination Switch (e.g., Domain ID2) | N/A |
| 172.16.20.25 | Locally-attached Intelligent service module | WWNN | Domain controller of attached switch (e.g., Domain ID1) | Port number of switch at which the intelligent service module attaches to switch |

TABLE 1-continued

Exemplary local federated management address (FMA) table

| Example IP/IPFC Address | Device Type | WWNN/ WWPN | Domain_ID | Port Number |
|---|---|---|---|---|
| 172.16.20.27 | Remotely-attached Intelligent service module | WWNN | Domain controller of attached switch (e.g., Domain ID2) | N/A |
| | End Device | WWPN | Domain ID for the end device | N/A |

It should also be understood that SAN devices may also be referenced by other unique identifiers, including Fibre Channel addresses (e.g., FCIDs), IPFC addresses, and iSCSI addresses.

An IPFC module on the switch 402 wraps the request in an IPFC frame in order to forward the request in-band across a fibre channel connection. When the switch 402 looks up another destination address in the FMA table, it first reads the Type field in the table row associated with the IP/IPFC address in the request to determine how to route the request. If the Type designates another switch, the IPFC-wrapped request is sent to the domain controller for the switch associated with the received IPFC address using the WWNN for the destination switch. For an intelligent service module attached to the switch 402, the switch 402 sends the IPFC-wrapped request to the fabric controller address FFFFFD using the port number for the specified intelligent service module. For an intelligent service module not attached to the switch 402 (e.g., switch 410), the IPFC-wrapped request is sent to the domain controller of the intermediary switch 404 using the WWNN for that switch. The switch 404 is then responsible for forwarding the request to the intelligent service module 410 using its own local FMA table. For an end device, the IPFC frame is forwarded to the end device using the WWPN and the Domain ID.

Figure 5:
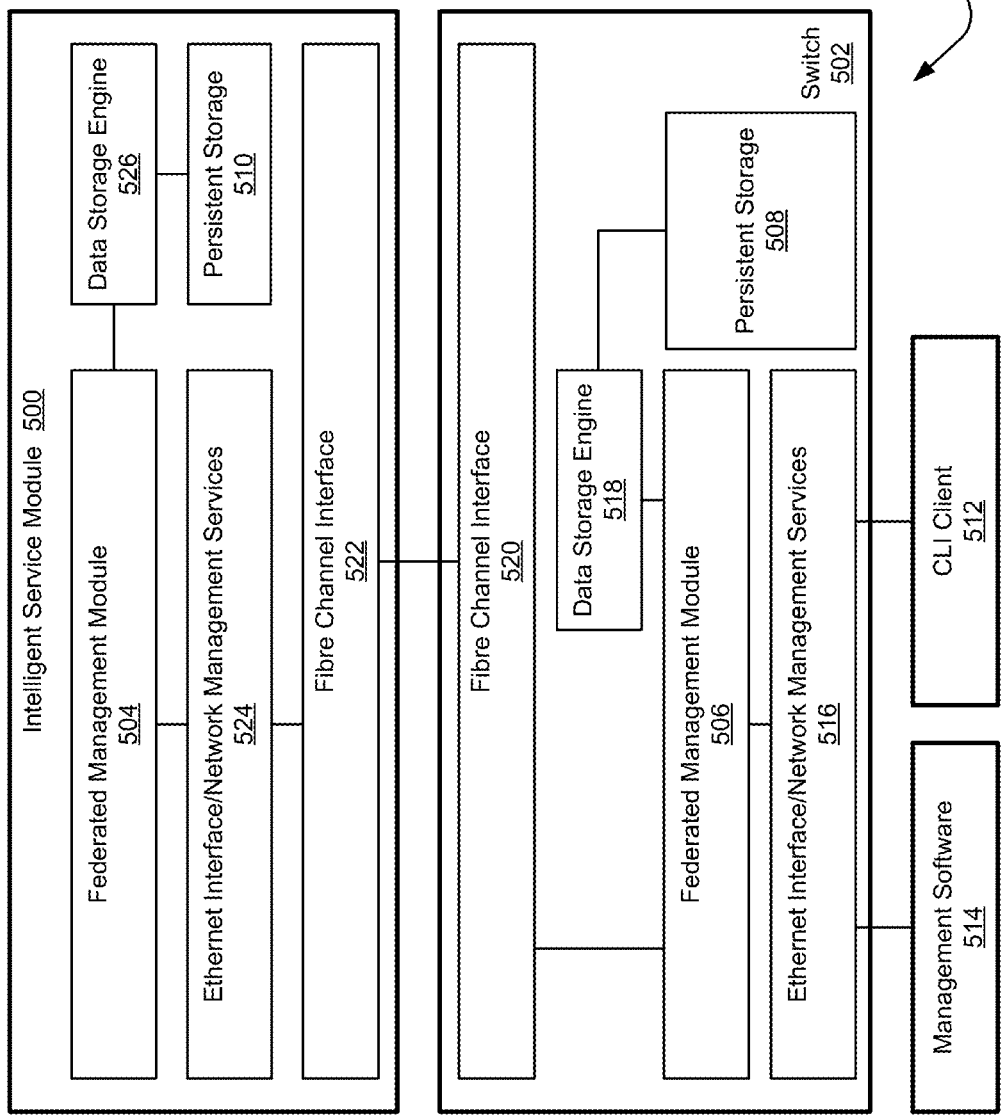
FIG. 5 illustrates exemplary component modules of an intelligent service module and a switch.

FIG. 5 illustrates exemplary component modules of an intelligent service module 500 and a switch 502. The management software 514 and CLI (command line interface) client 512 provide interfaces through which a user can manage the devices in the storage network. Typically, the computer executing the management software 514 may be connected to the switch 502 by an Ethernet connection, and the computer executing the CLI client 512 may be connected to the switch 502 by a serial connection.

The switch 502 and the intelligent service module 500 each include one or more processors controlled by firmware, which embodies instructions for executing the various modules illustrated in FIG. 5. At power-up, components of the firmware are read from persistent storage (e.g., flash memory) on the device and executed by the processor. Individual modules are illustrated to describe an exemplary functional division in one implementation of a switch and one implementation of an intelligent service module. It should be understood, however, that alternative functional divisions may be employed, and some functions may be implemented in circuitry.

Federated management modules 504 and 506 in the intelligent service module 500 and the switch 502 respectively are similar, although the two federated management modules 504 and 506 may have different functionality. In one implementation, the functionality of the federated management modules 504 and 506 is allocated as follows:

Federated management module for an intelligent service module
  Maintains the state of the intelligent service module
  Handles communications of intelligent service module configuration data with the switch
  Forwards asynchronous data to the switch
Federated Management Module for a Switch
  Maintains state for each intelligent service module connected through federated management by the switch
  Handles initialization of intelligent service module IPFC addresses
  Handles verification of federated management firmware levels
  Handles communications of intelligent service module configuration data with the intelligent service module
  Receives asynchronous data from the intelligent service module The federated management modules 504 and 506 implement one or more APIs (application programming interfaces). One exemplary API is termed the federated management API, which provides an interface for management subsystems (e.g., firmware services) to access the intelligent service module 500 from the switch 502. In one implementation, the federated management API functions are written in C Programming Language source code for platform independence. Each of the functions creates XML commands corresponding to the API type and supplied parameters. Such XML commands are sent to the federated management module on the opposite side of the switch/server-module connection via IPFC. The receiving federated management module parses the XML command and calls the appropriate environment API function. Exemplary commands, functions, and formats include:

TABLE 2

Exemplary federated management API calls and XML format

| Command Schema | Function Name | Description | Example |
|---|---|---|---|
| Call | get - | Retrieves values from an intelligent service module | <call name="function_name" id=idNum optionalAttr(s)=optionalValues(s)"> $p_1,p_2,p_3,...,p_N$ </call> |
| | set - | Set values of an intelligent service module | OR <call name="function_name" id=idNum optionalAttr(s)=optionalValues(s)"> |

TABLE 2-continued

Exemplary federated management API calls and XML format

| Command Schema | Function Name | Description | Example |
|---|---|---|---|
| | notify - | Used to communicate asynchronous changes in device | $<tag_0> \ldots </tag_0>$<br>$<tag_1> \ldots </tag_1>$<br>...<br></call><br>where idNum is a unique sequence number to align requests and responses, optionalAttr(s) specifies optional calling parameter statements, pn specifies optional calling parameters, and tagx specifies optional internal tag structures - (issued by switch). |
| Return | set - | Returns success or error in response to a "call set" function | <return name="function_name" id=idNum<br>    error="errornum"><br>    $p_1,p_2,p_3,\ldots,p_N$<br></return><br>OR<br><return name="function_name" id=idNum<br>    error="errornum"><br>    $<tag_0> \ldots </tag_0>$<br>    $<tag_1> \ldots </tag_1>$<br>    ...<br></return><br>where idNum is a unique sequence number to align requests and responses, error specifies an integer error number (0 equals success), pn specifies optional calling parameters, and tagx specifies optional internal tag structures - (issued by intelligent service module). |
| Notify | get -<br>set - | Retrieves values from a switch<br>Set values of a switch | <notify name="function_name"<br>    optionalAttr(s)=optionalValues(s)"><br>    $p_1,p_2,p_3,\ldots,p_N$<br></notify><br>where optionalAttr(s) specifies optional calling parameter statements and pn specifies optional calling parameters - (issued by intelligent service module) |

Another exemplary API is termed a host environment API, through which the federated management modules 504 and 506 accesses persistent storage, provides notification, and receives status information. The host environment API functions provide wrappers or translation functions between the management subsystems and the federation management modules.

One exemplary function performed by the federated management modules 504 and 506 is the communication of intelligent service module configuration data. Initially, the federated management module 506 in the switch 502 initializes generic configuration information pertaining to the intelligent service module 500, stores it in persistent storage 508 and then forwards the configuration information to the intelligent service module 500. The federated management module 504 in the switch module 500 receives the generic configuration information from the switch, stores it in persistent storage 510, and when appropriate, supplements the configuration information in the persistent storage 510 with service-module-specific configuration information (e.g., configuration information specific to the type or instance of the intelligent service module 500). The configuration data (both generic and service-module-specific) is mirrored on both the intelligent service module 500 and the switch 502 to provide a backup for each device.

One example of an API data flow includes a command line interface (CLI) command from the CLI client 512 through the switch to configure a port parameter physically belonging to the intelligent service module 500. The data flow starts with entry of a command through the interface of the CLI client. The command data is sent via a serial interface through the Ethernet interface/network management service 516 to the federated management module 506 in the switch 502. The federated management module 506 first stores the command data locally in the persistent storage 508 via the data storage engine 518 and then determines that the port number provided in the command data applies to the attached intelligent service module 500. Alternatively, the federated management module 506 may not store the command data locally in the persistent storage 508 (e.g., when the command data is intended only for an attached intelligent service module).

Having identified the destination intelligent service module 500, the federated management module 506 calls a federated management API function that creates an XML string with parameters and sends it to the destination intelligent service module 500 via IPFC through the fibre channel interface 520. The XML string is received by the intelligent service module 500 through the fibre channel interface 522 and the Ethernet interface/network management service 524 to the federated management module 504 in the intelligent service module 500. The federated management module 504 then calls the appropriate host environment API function to effect the configuration change to port parameter of the intelligent service module 500. The configuration change is written to the persistent storage 510 via a data storage engine 526, which returns a success or failure return code. Assuming the configuration change at the intelligent service module is successful, a successful return code is returned to the switch 502, which makes a similar change to the configuration information stored in the switch 502 in order to keep the configuration information in the switch 502 synchronized (i.e., "mirrored") with the configuration information in the intelligent service module 500.

In another example, a port property change occurs on the intelligent service module 500, which issues an asynchronous notification to the switch 502. A status subsystem in the intelligent service module 500 detects the port property change and calls the federated management API function to create an XML string with parameters as a notification of the change. The federated management module 504 transfers the notification of the change to the switch 502 via IPFC and the fibre channel interfaces of the intelligent service module 500 and the switch 502. On the switch side of the communication, the federated management module 506 parses the XML string and calls the appropriate host environment API function to update the status information in the switch 502.

Figure 6:
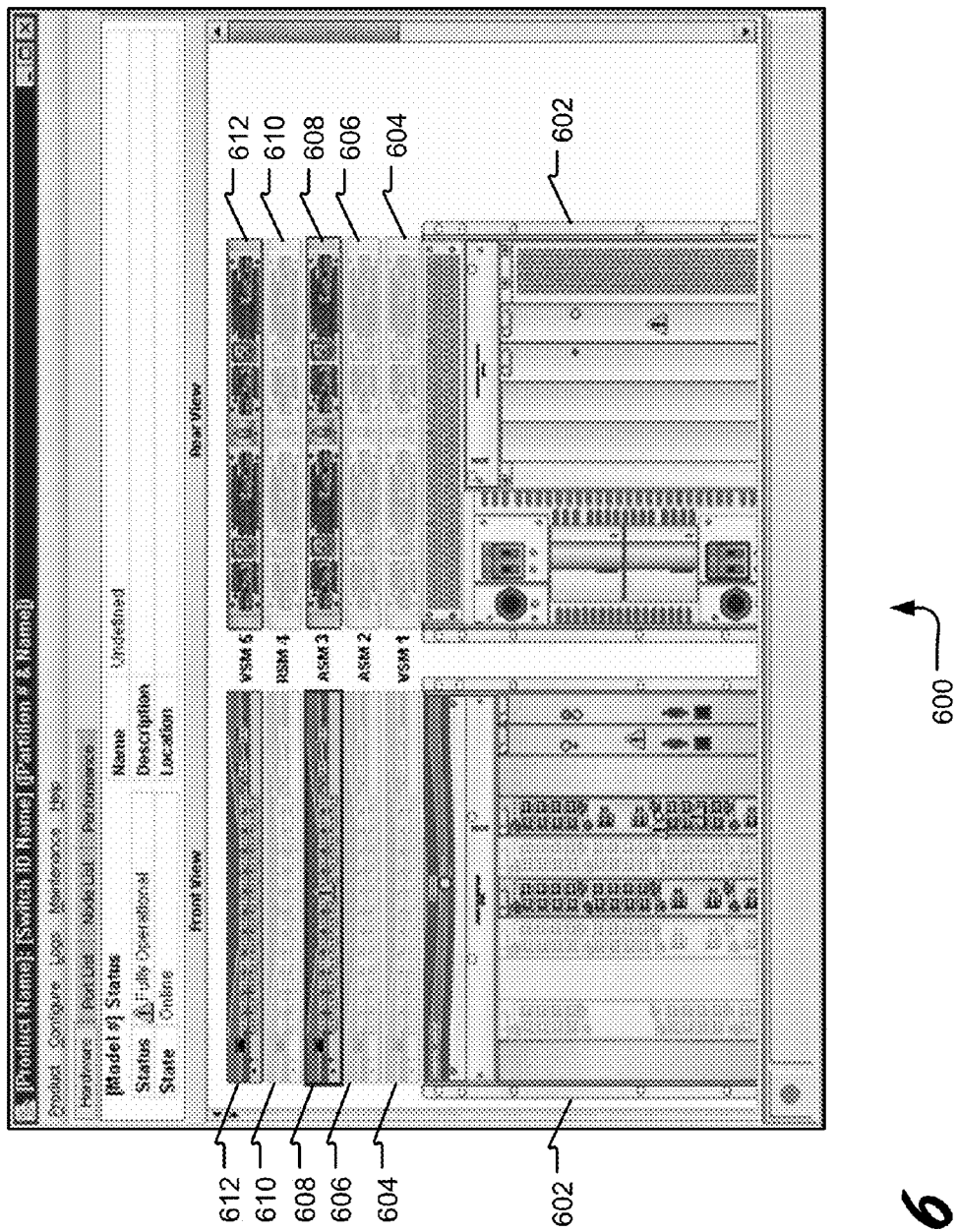
FIG. 6 illustrates an exemplary screenshot from a management software client.

FIG. 6 illustrates an exemplary screenshot 600 from a management software client. The screenshot 600 displays a graphic of a switch 602 in a chassis that includes line card blades, control processors blades, power supplies, fan trays, etc. Although not shown in the screenshot graphics, switch 602 and the intelligent service modules 604, 606, 608, 610, and 612 are connected via fibre channel cables between the front ports of the intelligent service modules and the front ports of the line cards in the switch chassis. The management software client executes on a workstation that is coupled to a management Ethernet port of the switch 602 and, therefore, controls functionality of the switch 602, including configuration, zoning, security, monitoring of the switch. Furthermore, in light of the federated management architecture, the management software client can also control functionality of properly-configured intelligent service modules attached to the switch 602, such as virtualization intelligent service modules (VSMs) 604 and 612, routing intelligent service module (RSM) 610, and aggregation intelligent service modules (ASMs) 606 and 608.

Figure 7:
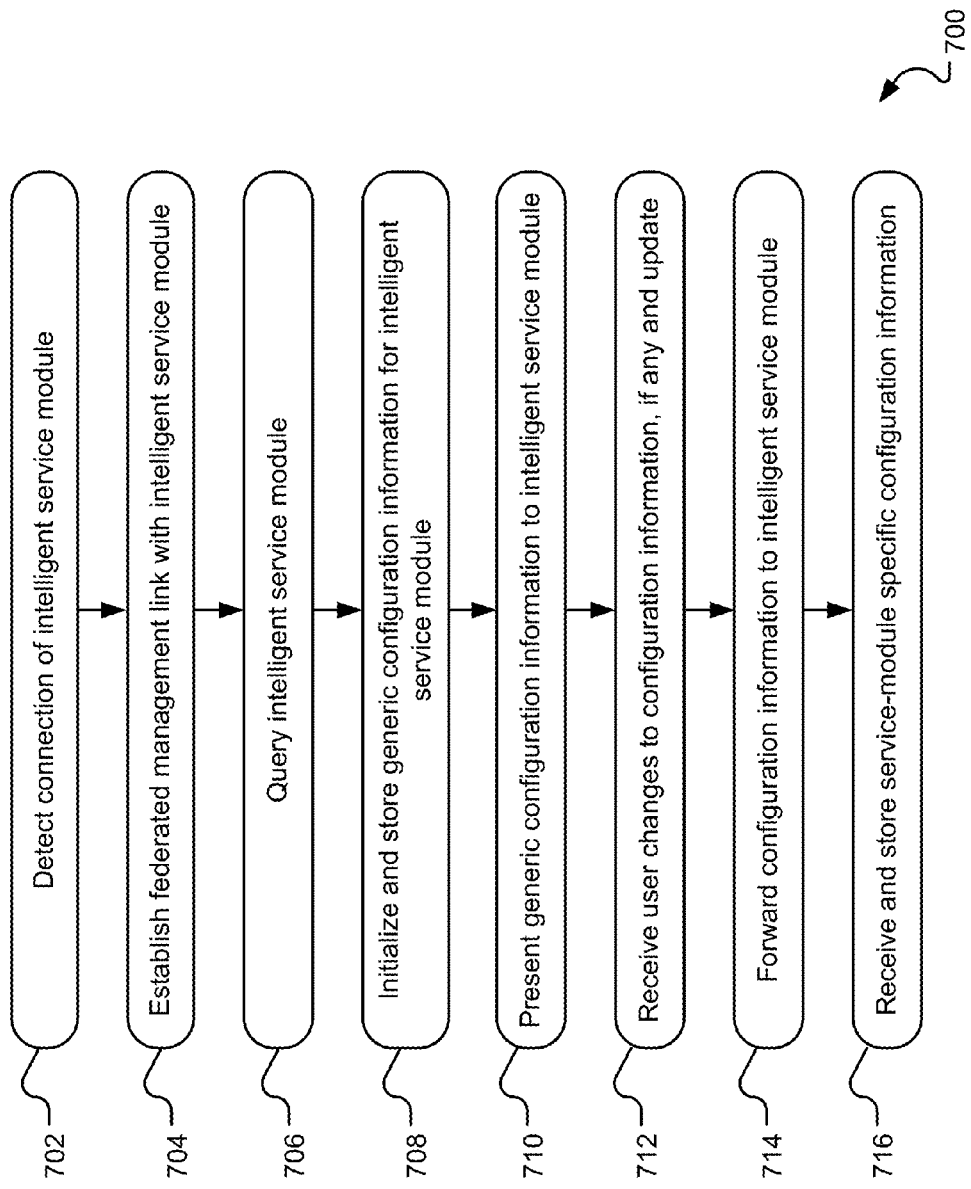
FIG. 7 illustrates exemplary operations for initializing intelligent service module federated management, from the perspective of the switch.

FIG. 7 illustrates exemplary operations 700 for initializing intelligent service module federated management, from the perspective of the switch. A detecting operation 702 detects connection of an intelligent service module via a fibre channel port (or possibly an extender port). In one implementation, the connection is detected by a fabric services component of the switch, which notifies the federated management module that an intelligent service module has been connected.

In response to detecting an intelligent service module connection, a link operation 704 initializes a federated management link with the intelligent service module. The federated management module collects a World Wide Node Name (WWNN) from the intelligent service module and collects a range of area IDs for the intelligent service module, a domain ID to be assigned to the intelligent service module, and an IPFC address for the intelligent service module from the user or configuration data through the management software. Alternatively, a set of available values may be pre-defined in the management software or switch and dynamically allocated when an intelligent service module is connected to the switch.

In a querying operation 706, the federated management module then transmits and assigns the IPFC address to the intelligent service module, and on the basis of that IPFC address, queries the intelligent service module for its type (e.g., VSM, ASM, RSM, etc.), its firmware version (and corresponding API version), and the number of logical ports requested by the intelligent service module. In a configuration operation 708, the federated management module locally stores the collected information and other default values attributable to the intelligent service module as configuration information for the intelligent service module.

In a transmission operation 710, the switch presents a portion of the configuration information to a management software client or CLI client and awaits a response from a user. An exemplary set of configuration information parameters sent to the user may include the intelligent service module type, the IPFC address, the firmware version, the number of requested logical ports, the WWNN, the range of area IDs, and the domain ID to be assigned to the intelligent service module.

In a receiving operation 712, the switch receives the response set of configuration information from the user, via a management interface. This set of configuration information may have been changed by the user. In addition, the response from the user includes an acceptance or rejection of the intelligent service module into the federated management configuration. (In some circumstances, the user may wish to manage the intelligent service module independently of the switch.) If there are any changes to the configuration information, the federated management module updates the switch's local storage of the configuration information.

A transmission operation 714 forwards the configuration information to the intelligent service module, including logical port assignments, data inherited from the switch, port configuration information, etc. In one implementation, transmission of the domain ID and area ID range to the intelligent service module is accomplished using a separate FC-SW exchange, although in an alternative implementation, the transmission operation 714 may forward all of the configuration information together. (FC-SW represents a switch interoperability standard using in-band communications).

In one implementation, the intelligent service modules are organized using a numbering structure, which uniquely indexes individual intelligent service modules, physical ports, port areas, and logical ports. Each intelligent service module is designated with an intelligent service module identifier or index, which may be configured by a user. The intelligent service module identifier is unique for each intelligent service module attached to the same switch. In one convention, the switch is assumed to be index 0, and any attached intelligent service module is numbered index 1 through N, where N is the limit of intelligent service modules that may be attached to a single director. Each intelligent service module also has a service-module-context port number, referred to as a port locator. As such, a port of any intelligent service module can be referenced by a value pair including the intelligent service module identifier and the port locator.

In addition, each intelligent service module port can be referenced by an integer number within the context of the switch. The switch-context identifier is generally dependent on the type and specifications of the switch.

In one implementation, the switch firmware presents both service-module-context descriptions and switch-context descriptions to the management software. Accordingly, an exemplary data structure for identifying a service-module port using 32-bits is employed:

```
struct PORT_COMPOSITE_DESCRIPTION {
    UNS16    port_integer;
    byte     sm_index;
    byte     port_locator;
}
```

It should be understood, however, that other data structures may be employed, and either the port_integer value or the sm_index:port_locator value may be used individually as needed. For example, management software may include a look-up table that maps port_integer values to sm_index: port_locator values and/or vice versa.

The intelligent service module mirrors the configuration information in its own local storage, gathers service-module-specific information, updates the configuration information in local storage with this service-module-specific information, and returns the service-module-specific information to the switch. In receiving operation 716, the switch receives and stores the service-module-specific information from the intelligent service module, updating its local storage with the new information. To this point, the intelligent service module remains offline.

Figure 8:
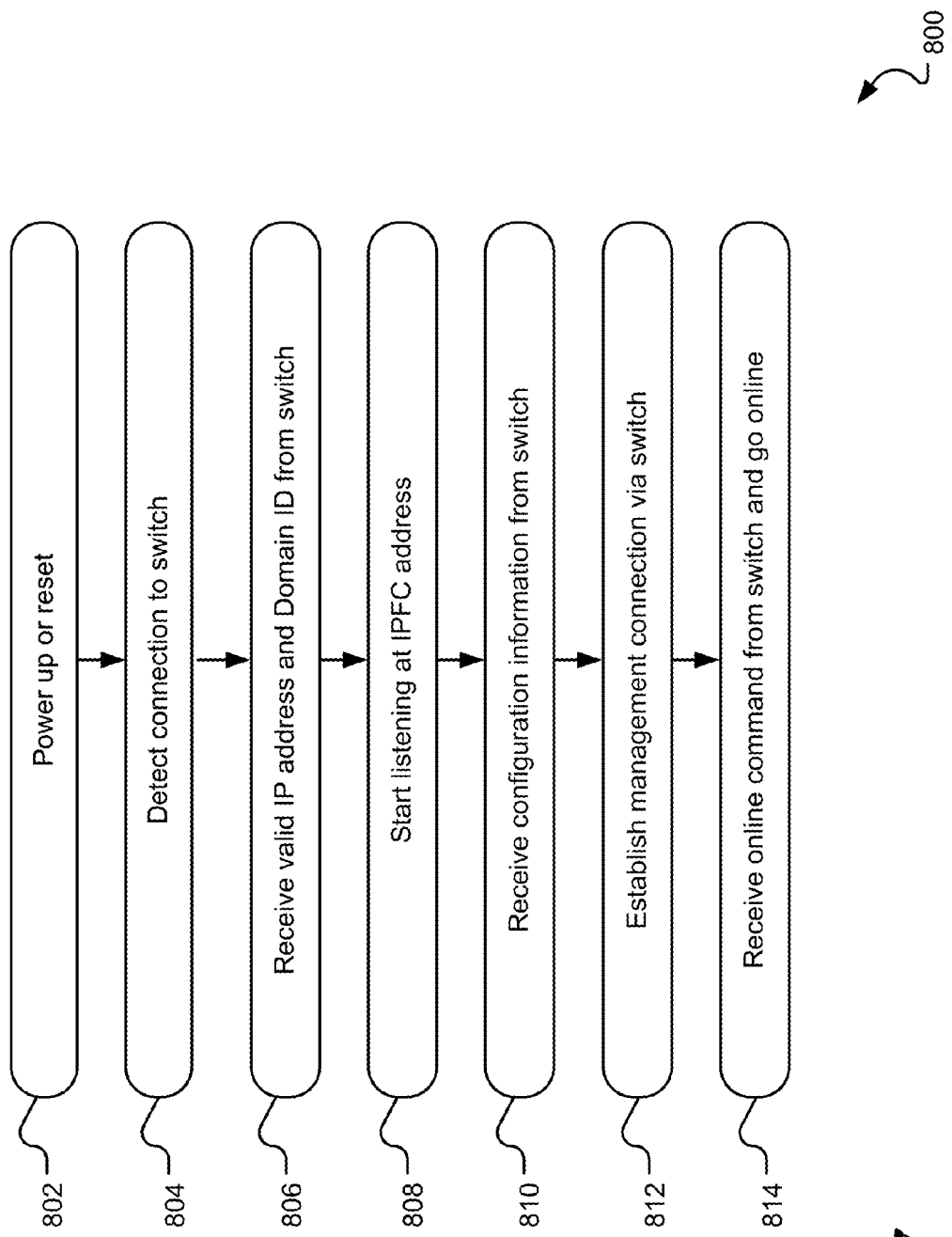
FIG. 8 illustrates exemplary operations for initializing an intelligent service module, from the perspective of the intelligent service module.

FIG. 8 illustrates exemplary operations 800 for initializing an intelligent service module, from the perspective of the intelligent service module. A power operation 802 powers up or resets the intelligent service module. After the intelligent service module is operational, a detection operation 804 detects a connection to a switch and makes itself available to receive data via the connection.

An address operation 806 receives the IPFC address and domain ID from the switch, which are also stored in the local storage of the intelligent service module. A listening operation 808 sets a network management intelligent service module to listen for messages on the appropriate TCP port capable of servicing the IPFC address.

If the user indicates that the intelligent service module is to be managed through the switch via federated management, a configuration operation 810 receives generic configuration information from the switch, which may include user-specified parameters, and stores the configuration information in the local storage of the intelligent service module. The configuration operation 810 also gathers service-module-specific configuration information from the intelligent service module's components and updates the locally stored configuration information with the service-module-specific configuration information. The updated configuration information can be sent back to the switch to ensure that the switch mirrors the updated information.

In a connection operation 812, the management software client or CLI interface establishes a management connection with the intelligent service module through the switch. In one implementation, this connection is accomplished through a fibre channel cable via the switch. In an alternative implementation, this connection is accomplished through a backplane extender port and cabling to a switch module. Management requests to the intelligent service module are forwarded from the switch in accordance with the addressing schemes described herein or some other applicable addressing scheme. When, in receiving operation 814, the intelligent service module receives an "online" command from the fabric services of the switch, the intelligent service module begins providing its intelligent service (e.g., routing, security, aggregation, virtualization, etc.) to the storage network.

Figure 9:
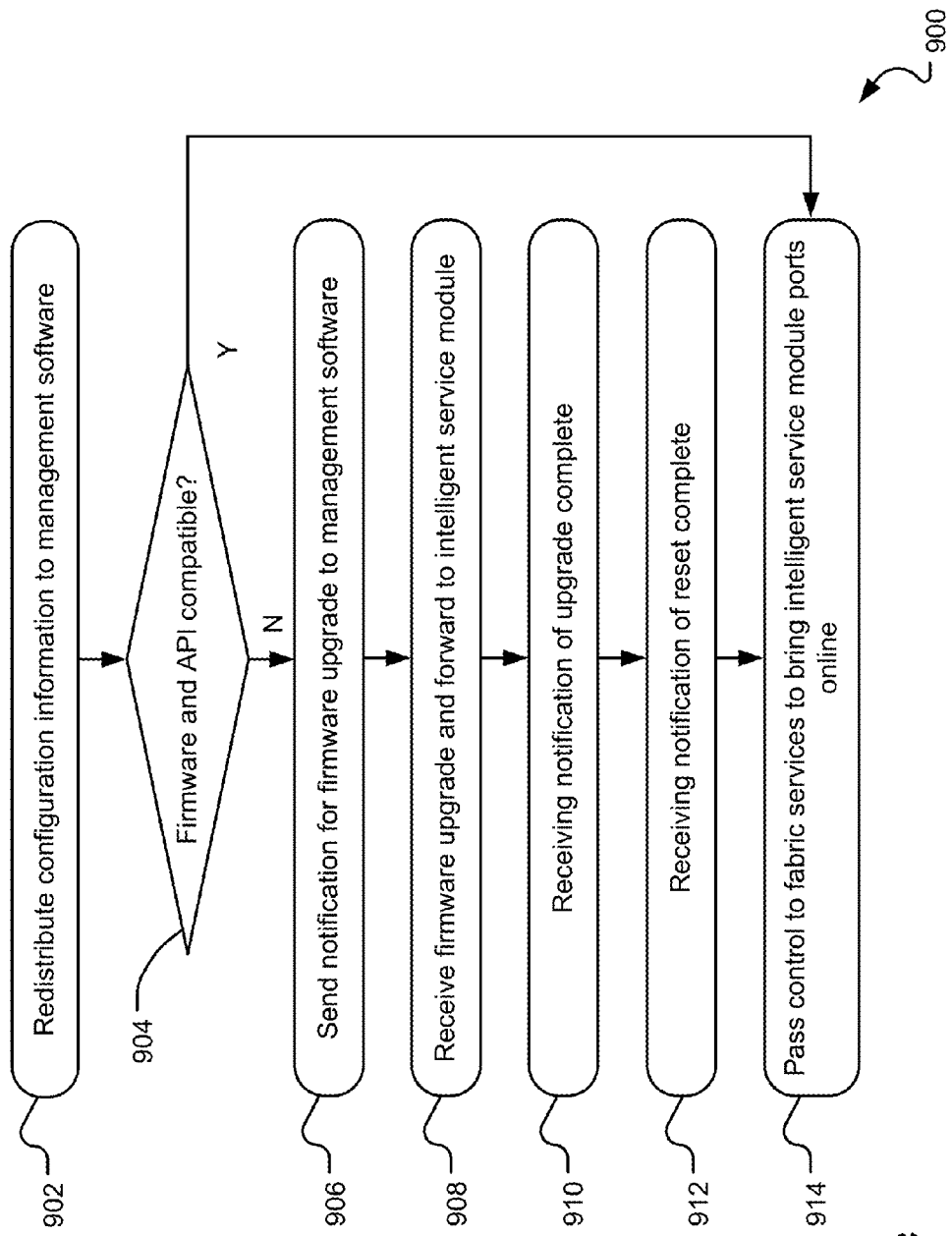
FIG. 9 illustrates exemplary operation for bringing an intelligent service module online.

FIG. 9 illustrates exemplary operation 900 for bringing an intelligent service module online. A distribution operation 902 redistributes information about the switch and attached intelligent service modules, emulating a new discovery operation. In this manner, the management software has updated information describing the switch in its new incarnation, which includes one or more new intelligent service modules (or alternatively, some change to the set of attached intelligent service modules).

In compatibility operation 904, the switch compares the firmware and API versions provided by each intelligent service module and determines whether a firmware update is required. In one implementation, the switch firmware maintains compatibility information in the form of a configuration file. The file specifies which firmware and API versions on the service modules are compatible with the current switch firmware. Alternatively, a database of compatibility information can be maintained and accessed by the switch firmware.

If the firmware versions and API versions are not compatible between the switch's firmware and the intelligent service module's firmware, an upgrade request operation 906 requests an intelligent service module firmware upgrade from the management software client, which alerts the user that an upgrade is needed. If the user approves, an upgrade operation 908 sends the upgraded firmware to the intelligent service module via the switch and causes it to be installed in the intelligent service module. The intelligent service module notifies the switch when the installation is complete (notification operation 910), resets, and then notifies the switch that the reset is complete (notification operation 912).

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The above specification, examples and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A method comprising:
    receiving an intelligent service module management request at a switch within a network, the intelligent service module management request is indicative of performing a set of network services and is associated with an intelligent service module;
    analyzing, by the switch, routing information encapsulated within the intelligent service module management request to identify the intelligent service module, wherein the intelligent service module is configured to provide at least one fabric-based intelligent service based on receiving the intelligent service module management request, wherein the at least one fabric-based intelligent service includes at least one of the network services; and
    forwarding the intelligent service module management request, by the switch and using the routing information encapsulated within the intelligent service module management request, to the intelligent service module via at least one communication connection;
wherein the switch and the intelligent service module are part of a same domain.

2. The method of claim 1, further comprising:
receiving a response to the intelligent service module management request from the intelligent service module via the at least one communication connection.

3. The method of claim 1, further comprising:
receiving, at the switch, a second intelligent service module management request, the second intelligent service module management request specifying routing information that identifies a second intelligent service module; and
forwarding, by the switch, the second intelligent service module management request to a second switch associated with the second intelligent service module.

4. A network switch comprising:
a first port for communicative coupling to receive a management request within an network, wherein the management request is indicative of performing a plurality of network services;
a second port for communicative coupling to an intelligent service module; and
circuitry configured to:
analyze the management request to identify the intelligent service module, wherein the intelligent service module is configured to provide at least one fabric-based intelligent service, wherein the at least one fabric-based intelligent service includes at least one of the network services; and
forward the management request from the first port to the second port;
wherein the network switch and the intelligent service module are part of a same domain.

5. The method of claim 1, wherein the at least one communication connection is an in-band communication between the switch and the intelligent service module.

6. The method of claim 1, wherein the intelligent service module is located external to the switch.

7. The method of claim 1, further comprising:
receiving a second intelligent service module management request at the switch, wherein the second intelligent service module management request is indicative of performing a second set of network services;
analyzing, by the switch, routing information encapsulated within the second management request to identify a second intelligent service module, wherein the second intelligent service module is configured to provide at least one second fabric-based intelligent service based on receiving the second intelligent service module management request, wherein the at least one second fabric-based intelligent service includes at least one of the second set of network services; and
forwarding the second intelligent service module management request, by the switch and using the routing information encapsulated within the second intelligent service module management request, to the second intelligent service module via a second communication connection,
wherein the second intelligent service module and the switch are part of the same domain.

8. The method of claim 7, wherein the second intelligent service module and the intelligent service module provide different fabric-based intelligent services.

9. The method of claim 1, wherein forwarding the intelligent service module management request, by the switch and using the routing information encapsulated within the intelligent service module management request, to the intelligent service module comprises forwarding the intelligent service module management request based on Internet Protocol (IP) packet forwarding.

10. The network switch of claim 4, wherein the second port is configured to receive a response to the management request from the intelligent service module via the at least one communication connection.

11. The network switch of claim 4, wherein the first port is configured to receive a second management request that includes encapsulated routing information,
wherein the circuitry is further configured to identify a second intelligent service module to route the second management request based on the routing information,
wherein the network switch further comprises a third port coupled to the circuitry, and
wherein the third port is configured to forward the second management request to a second switch associated with the second intelligent service module.

12. The network switch of claim 4, wherein the first port is configured to receive a second management request, wherein the second management request is indicative of performing a second plurality of network services,
wherein the circuitry is further configured to analyze routing information encapsulated within the second management request to identify a second intelligent service module, wherein the second intelligent service module is configured to provide at least one second fabric-based intelligent service based on receiving the second management request, wherein the at least one second fabric-based intelligent service includes at least one of the second plurality of network services,
wherein the network switch further comprises a third port coupled to the circuitry, wherein the third port is configured to transmit the second management request to the second intelligent service module, and
wherein the network switch and the second intelligent service module are part of the same domain.

13. The network switch of claim 12, wherein the second intelligent service module and the intelligent service module provide different fabric-based intelligent services.

14. The network switch of claim 4, wherein a communication connection between the network switch and the intelligent service module is an in-band communication.

15. A system comprising:
an intelligent service module configured to provide at least one fabric-based intelligent service based on receiving the management request, wherein the at least one fabric-based intelligent service includes a first network service;
a communication link;
a switch coupled to the intelligent service module via the communication link within a network, wherein the switch is configured to:
receive a management request, wherein the management request is indicative of performing a plurality of network services;
identify the intelligent service module based on encapsulated routing information within the management request, wherein the first network service is one of the network services indicated in the management request; and
forward the management request to the intelligent service module based on the encapsulated routing information within the management request, wherein the switch and the intelligent service module are within a same domain.

16. The system of claim 15, wherein the intelligent service module is configure to transmit a response to the request back to the switch via the communication connection.

17. The system of claim 15, wherein the switch is configured to:
receive a second management request that includes encapsulated routing information that identifies a second intelligent service module; and
forward the second request to a second switch associated with the intelligent service module.

18. The system of claim 15, wherein the communication link is an in-band communication between the switch and the intelligent service module.

19. The system of claim 15, further comprising a second intelligent service module coupled to the switch, wherein the second intelligent service module is configured to provide at least one second fabric-based intelligent service based on receiving the second management request, wherein the at least one second fabric-based intelligent service includes a second network service, and wherein the switch is configured to:
receive a second management request, wherein the second management request is indicative of performing a second plurality of network services;
identify the second intelligent service module based on encapsulated routing information within the second management request, wherein the second network service is one of the second plurality of network services indicated in the second management request; and
forward the second management request to the second intelligent service module based on the encapsulated routing information within the second request,
wherein the switch and the second intelligent service module are within the same domain.

20. The system of claim 19, wherein the first network service and the second network service are different network services.

* * * * *